(12) United States Patent
Kelsch et al.

(10) Patent No.: US 8,749,194 B1
(45) Date of Patent: Jun. 10, 2014

(54) INDUCTIVE CHARGING RETAIL DISPLAY DEVICE

(75) Inventors: Christopher A. Kelsch, Palm Harbor, FL (US); John N. Figh, Jr., Oldsmar, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 625 days.

(21) Appl. No.: 13/030,616

(22) Filed: Feb. 18, 2011

(51) Int. Cl.
*H02J 7/00* (2006.01)
*H02J 7/02* (2006.01)

(52) U.S. Cl.
USPC .......... 320/108; 320/111; 320/114; 320/115

(58) Field of Classification Search
CPC ........................................ H02J 7/025
USPC ......................................... 320/108
See application file for complete search history.

(56) References Cited

U.S. PATENT DOCUMENTS

| | | | |
|---|---|---|---|
| 3,938,018 A | 2/1976 | Dahl | |
| 4,031,449 A | 6/1977 | Trombly | |
| 5,122,729 A | 6/1992 | Itoga et al. | |
| 5,124,685 A | 6/1992 | Rankin | |
| 5,455,466 A | 10/1995 | Parks et al. | |
| 5,550,452 A | 8/1996 | Shirai et al. | |
| 5,568,036 A | 10/1996 | Hulsey et al. | |
| 5,734,254 A | 3/1998 | Stephens | |
| 5,952,814 A | 9/1999 | Van Lerberghe | |
| 5,959,433 A | 9/1999 | Rohde | |
| 6,163,132 A | 12/2000 | Higuchi et al. | |
| 6,236,435 B1 | 5/2001 | Gertz | |
| 6,331,744 B1 | 12/2001 | Chen et al. | |
| 6,386,906 B1 | 5/2002 | Burke | |
| 6,489,745 B1 | 12/2002 | Koreis | |
| 6,683,438 B2 * | 1/2004 | Park et al. | 320/108 |
| 6,799,994 B2 | 10/2004 | Burke | |
| 6,906,495 B2 | 6/2005 | Cheng et al. | |
| 6,917,182 B2 | 7/2005 | Burton et al. | |
| 7,061,757 B2 * | 6/2006 | Kuo et al. | 361/679.45 |
| 7,159,053 B1 * | 1/2007 | Lakin | 710/62 |
| 7,180,248 B2 | 2/2007 | Kuennen et al. | |
| 7,375,492 B2 | 5/2008 | Calhoon et al. | |
| 7,411,577 B2 * | 8/2008 | Kim et al. | 345/156 |
| 7,429,984 B2 | 9/2008 | Sweeney | |
| 8,497,659 B2 * | 7/2013 | Navid | 320/108 |
| 2005/0127868 A1 | 6/2005 | Calhoon et al. | |
| 2007/0001413 A1 * | 1/2007 | Rossini | 280/47.35 |
| 2008/0116847 A1 | 5/2008 | Loke et al. | |
| 2012/0245731 A1 * | 9/2012 | Reckelhoff | 700/243 |

\* cited by examiner

*Primary Examiner* — Edward Tso
*Assistant Examiner* — Ahmed Omar
(74) *Attorney, Agent, or Firm* — Andriy Lytvyn; Smith & Hopen, P.A.

(57) ABSTRACT

A retail display device for use with a plurality of inductively charged electronic devices includes a cable assembly having a length defined by a first and second end including at least one electrical conductor. A mounting member is adapted to receive the first end of the cable assembly. The mounting member is also adapted to be affixed to the plurality of inductively charged electronic devices. A primary coil for electromagnetic field coupling is disposed within the mounting member and in electrical communication with the at least one conductor of the cable assembly. The primary coil forms an electromagnetic field coupling with a secondary coil within the inductively charged electronic device so as to inductively convey energy for charging a rechargeable battery. In an alternate embodiment, the primary coil is disposed in a base member.

21 Claims, 6 Drawing Sheets

INDUCTIVE CHARGING RETAIL DISPLAY DEVICE

BACKGROUND OF THE INVENTION

1. Field of the Invention

This invention relates to the retail display of electronic devices. More particularly, it relates to the retail display of inductively charged electronic devices.

2. Description of the Related Art

In a retail setting, small electronic devices are often displayed in an operative state allowing for their demonstration. This manner of display allows for the device to be picked up and used by a potential customer. Mobile phones, for example, will often be placed along a counter in operative mode to be picked up by a potential customer for demonstration.

Recently, many electronic devices (mobile phones included) have been adapted to be inductively charged. Inductive charging of an electronic device is known in the art. For example, U.S. Ser. Nos. 10/733,820, 11/844,242, U.S. Pat. Nos. 3,938,018, 4,031,449, 5,122,729, 5,455,466, 5,550,452, 5,568,036, 5,734,254, 5,952,814, 5,959,433, 6,163,132, 6,331,744, 6,489,745, 6,906,495, 6,917,182, 7,180,248, 7,375,492, and 7,429,984, which are all hereby incorporated by reference, describe inductive charging of an electronic device.

Accordingly, what is needed is a retail display device that is attuned with inductively charged electronic devices and provides effective but discrete power, security, and monitoring of the inductively charged devices. However, in view of the prior art considered as a whole at the time the present invention was made, it was not obvious to those of ordinary skill in the art how the limitations of the art could be overcome.

SUMMARY OF INVENTION

Generally speaking, the claimed invention is a retail display device for inductively charged electronic devices. The retail display includes a cable assembly, a mounting member having a primary coil, and a base member. The cable assembly includes a length defined by a first and second end and includes at least one electrical conductor. The mounting member is adapted to receive the first end of the cable assembly and is affixed to an inductively charged electronic device. A primary coil for electromagnetic field coupling is disposed within the mounting member and is in electrical communication with the at least one conductor of the cable assembly. The primary coil forms an electromagnetic field coupling with a secondary coil within the electronic device so as to inductively convey energy for charging a rechargeable battery within the electronic device.

The base member includes a fastener for fastening it to a display rack, display counter, or the like. Each base member and mounting member are equipped with a respective mating support coupling so that the mounting member may be removably attached to and supported on the base member. Thus, an electronic device to be displayed may be removed from the base member and moved about as a customer demonstrates and tries out the device.

To eliminate the need for several different cables carrying different signals such as power, video, theft detection, charging monitoring, and other required signals, a single cable comprising multiple individual conductors is utilized. In an embodiment, the cable is partially stored on a retractable reel which provides for automatic extension and retraction of the cable as the device such as a mobile phone is picked up and moved about during customer demonstration. In this manner, cable knots and tangles are avoided, and the cable is neatly managed. In an alternate embodiment, the cable includes a coiled portion; the cable is partially coiled when in a repose position and partially uncoiled when in an extended position during customer demonstration.

The mounting member and the electronic device are affixed together. Because the electronic device is charged inductively, only one contact point is required. As stated above, the cable assembly is consolidated into a single cable. In addition to supplying the electronic device with required signals, a preferred embodiment also provides discrete but effective anti-theft security. An anti-theft electronic circuit is carried by one of the cable's multiple conductors. Should the cable be unplugged or cut in an attempt to steal the electronic device, the anti-theft circuit will be opened thereby setting off an alarm.

An additional mechanical antitheft apparatus may be used. For example, a mechanical button disposed on a surface of the mounting member is connected to an anti-theft electronic circuit. When the mounting member is affixed to the electronic device, the mechanical button in compressed and the anti-theft electronic circuit is closed, indicating that the mounting member and the electronic device are affixed together. Should the mounting member be detached from the electronic device, the anti-theft circuit will be opened thereby setting off an alarm.

In an embodiment, the second end of the cable assembly is in communication with a CPU. The CPU monitors at least one of a power signal, a theft signal, a charging monitoring signal, a device monitoring signal, a customer interaction signal, or other required signals. In an alternate embodiment, the second end of the cable assembly is in communication with a source module. The source module is adapted to receive and transmit input and output source signals; for example, a plurality of retail display devices may be in communication with the source module, which is itself is in communication with a CPU, video display, or other device.

An embodiment of the invention also includes detection means for detecting when the mounting member is removed from the base member. This allows for marketing audio/video recording to be triggered upon the electronic device being picked up. It may also be useful to record when and for how long an electronic device was in use for purposes of security and maintenance. A preferred detection means comprises a magnetic reed switch. The reed switch is inactive when the mounting member is in a repose position resting on the base. When the electronic device is in use, the mounting member is removed from the base member, thereby tripping the reed switch. A circuit is then activated indicating that the device is in use. In an alternate embodiment, a light sensor may be used.

In an embodiment, the retail display device is configured to conform to the Qi standard as established by the Wireless Power Consortium for inductive charging. In this manner, the retail display device can be used with a variety of different electronic devices also configured to the Qi standard for inductive charging. This eliminates the need for changing several required cables when moving devices between display positions, and thereby allows for substantially easier and quicker device movement and installation than previously allowed.

In a second embodiment, the retail display includes a base member having a primary coil for displaying the inductively charged electronic devices. The base member includes at least one passage for at least one cable assembly to pass through.

The at least one cable assembly includes a length defined by a first and second end. The first end is attached to the electronic device (via a mounting member) and the second end is anchored. At least one primary coil for electromagnetic field coupling is disposed within the base member and is in electrical communication with a power source. The primary coil forms an electromagnetic field coupling with the secondary coil of the inductively charged electronic device so as to inductively convey energy for charging a rechargeable battery when the inductively charged electronic device is resting on the base member.

The invention has been described in reference to a preferred embodiment. It is understood that the description of the preferred embodiment is not intended to limit the invention in any manner. Other embodiments and applications of the invention will be obvious to those skilled in the art. For instance, it is clear that although the invention has been described as useful in the retail display of mobile phones, the apparatus and method of the invention could also be used in the display of other electronic devices such as but not limited to video cameras, computers, headphones, microphones, iPods, PDAs, calculators, and the like.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
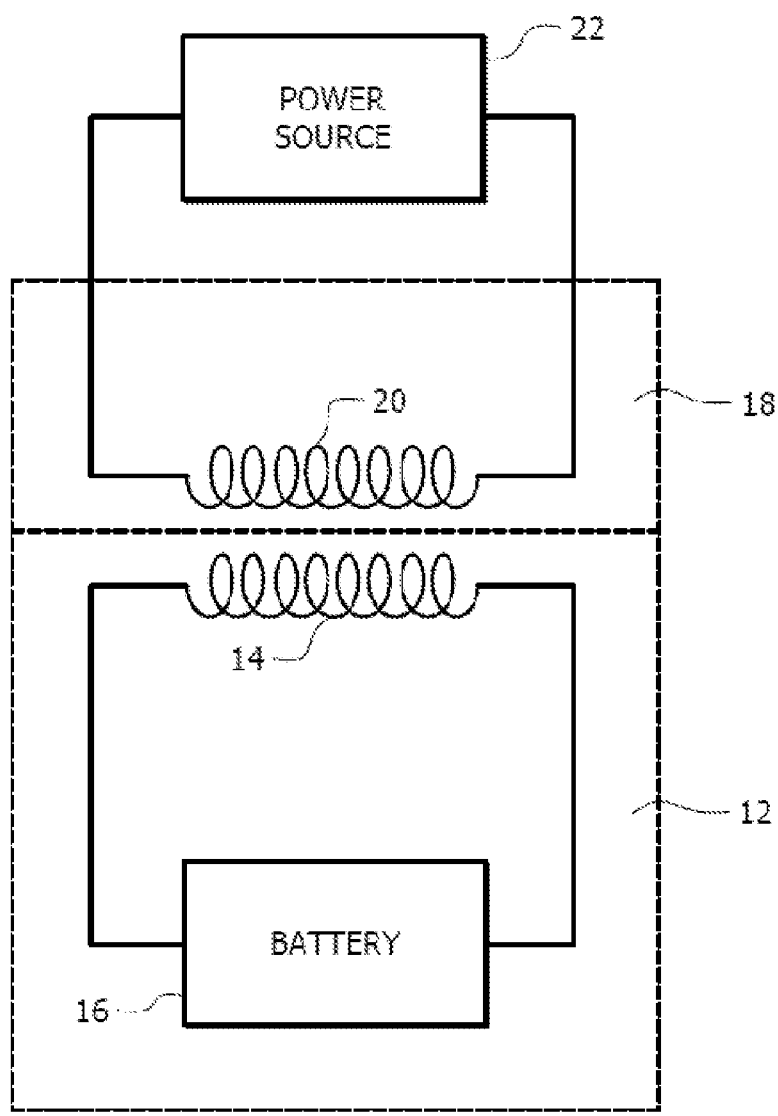
FIG. 1 is a block diagram depicting a mounting member having a primary coil affixed to a electronic device having a secondary coil such that the primary coil forms an electromagnetic field coupling with the secondary coil so as to inductively convey energy for charging a rechargeable battery within the electronic device.

In a first embodiment, the claimed invention is a retail display device, generally denoted as reference numeral 10, for use with a plurality of inductively charged electronic devices. The retail display includes a cable assembly, a mounting member having a primary coil, and a base member. The cable assembly includes a length defined by a first and second end and includes at least one electrical conductor. The mounting member is adapted to receive the first end of the cable assembly and is affixed to an inductively charged electronic device. A primary coil for electromagnetic field coupling is disposed within the mounting member and is in electrical communication with the at least one conductor of the cable assembly. The primary coil forms an electromagnetic field coupling with a secondary coil within the electronic device so as to inductively convey energy for charging a rechargeable battery within the electronic device.

As depicted in FIG. 1, inductively charged electronic device 12 includes secondary coil 14 and rechargeable battery 16. Mounting member 18 includes primary coil 20 in electrical communication with power source 22. Inductively charged electronic device 12 and mounting member 18 are affixed to each other such that primary coil 20 forms an electromagnetic field coupling with secondary coil 14 so as to inductively convey energy for charging rechargeable battery 16 within inductively charged electronic device 12.

Figure 2:
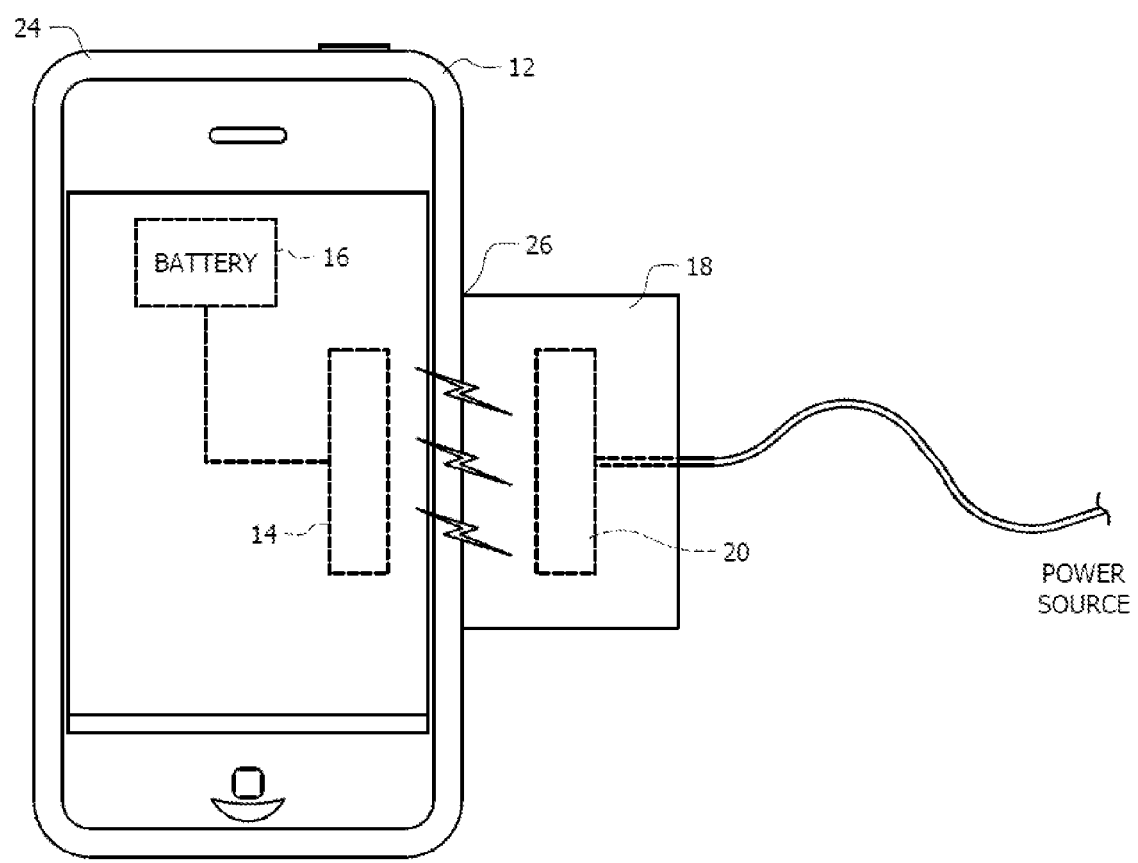
FIG. 2 is a is a block diagram depicting a mounting member having a primary coil affixed to a mobile phone having a secondary coil such that the primary coil forms an electromagnetic field coupling with the secondary coil so as to inductively convey energy for charging a rechargeable battery within the mobile phone.

FIG. 2 depicts an example of the first embodiment, where inductively charged electronic device 12 is mobile phone 24. Mobile phone 24 includes secondary coil 14 and rechargeable battery 16. Mounting member 18 includes primary coil 20 in electrical communication with a power source. Mobile phone 24 and mounting member 18 are affixed to each other at interface 26 such that primary coil 20 forms an electromagnetic field coupling with secondary coil 14 so as to inductively convey energy for charging rechargeable battery 16 within mobile phone 24.

Figure 3:
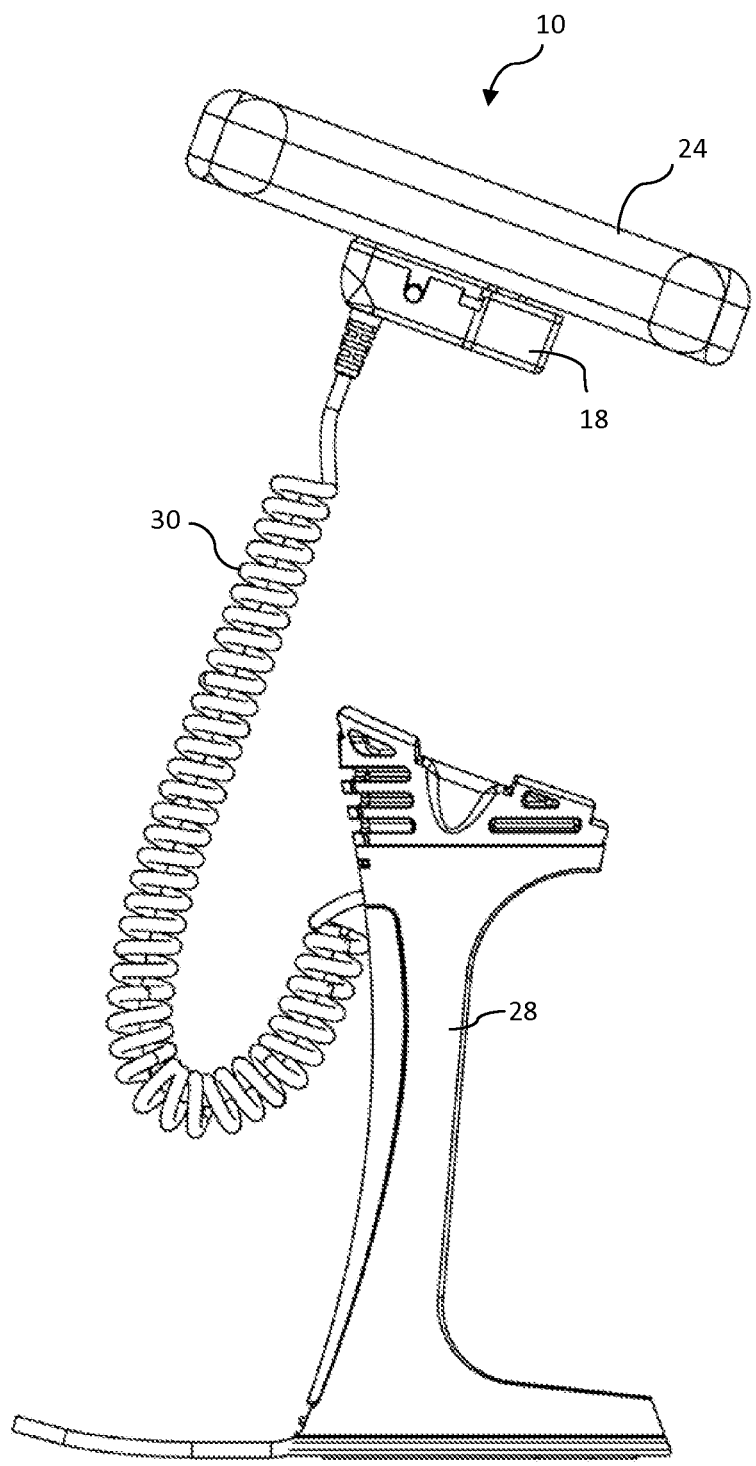
FIG. 3 is a schematic of an embodiment depicting a mounting member having a primary coil removed from a base member.
Figure 4:
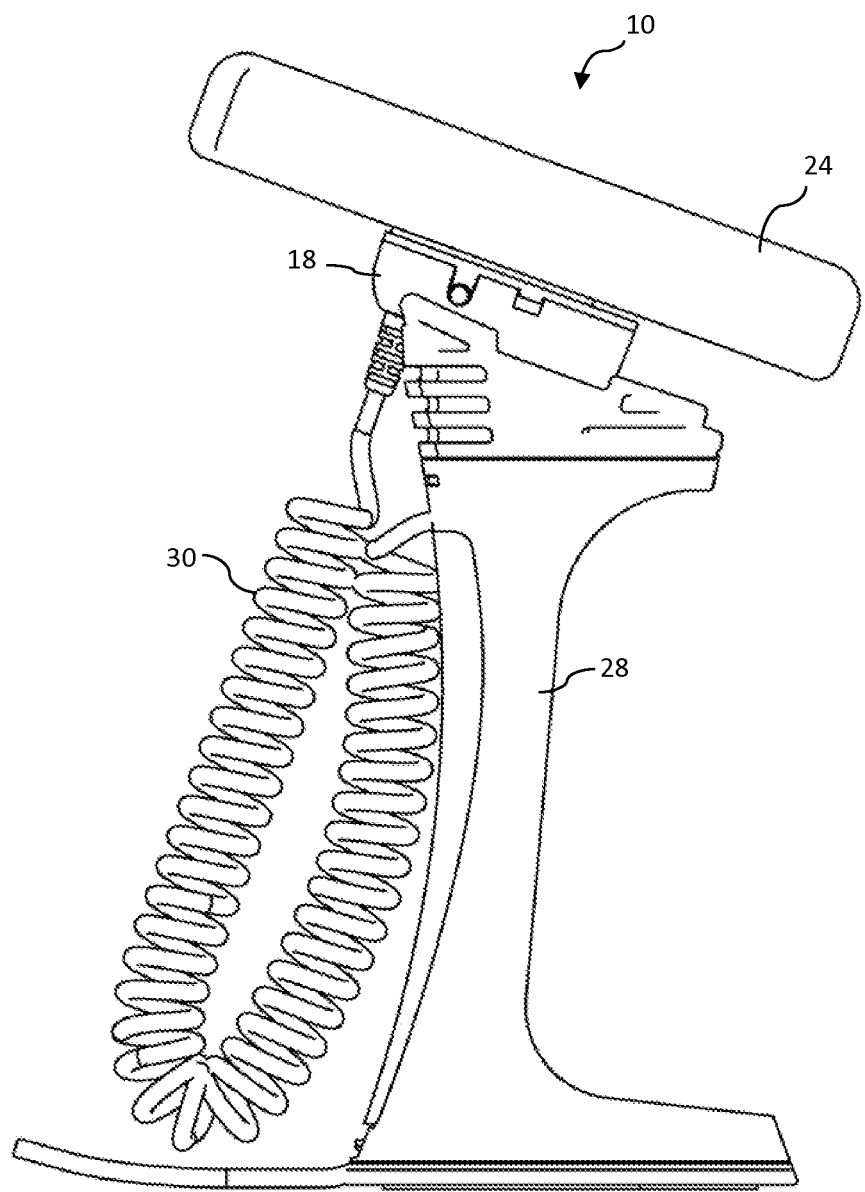
FIG. 4 is a schematic of an embodiment depicting a mounting member having a primary coil in place on the base member.

As depicted in FIGS. 3 and 4, retail display device 10 includes base member 28, cable 30, and mounting member 18. Mounting member 18 is removably attached to base member 28. As previously discussed in FIGS. 1 and 2, mounting member 18 includes a primary coil in electrical communication with a power source via cable 30, and mobile phone 24 and mounting member 18 are affixed to each other such that the primary coil within mounting member 18 forms an electromagnetic field coupling with a secondary coil within mobile phone 24. The primary coil inductively conveys energy to the secondary coil for charging mobile phone 24. In this embodiment, cable 30 is a coiled cable. Accordingly, as mounting member 18 with attached mobile phone 24 is removed from base member 28 and moved about by prospective customers, cable 30 is conveniently extended and recoiled.

In a second embodiment, the retail display includes a base member having a primary coil for displaying an inductively charged electronic device. This embodiment differs from the first embodiment because the primary coil does not move in conjunction with the electronic device. Instead, the primary coil is stationary within the base member. Once the electronic device is placed on the base member, it is charged.

Figure 5:
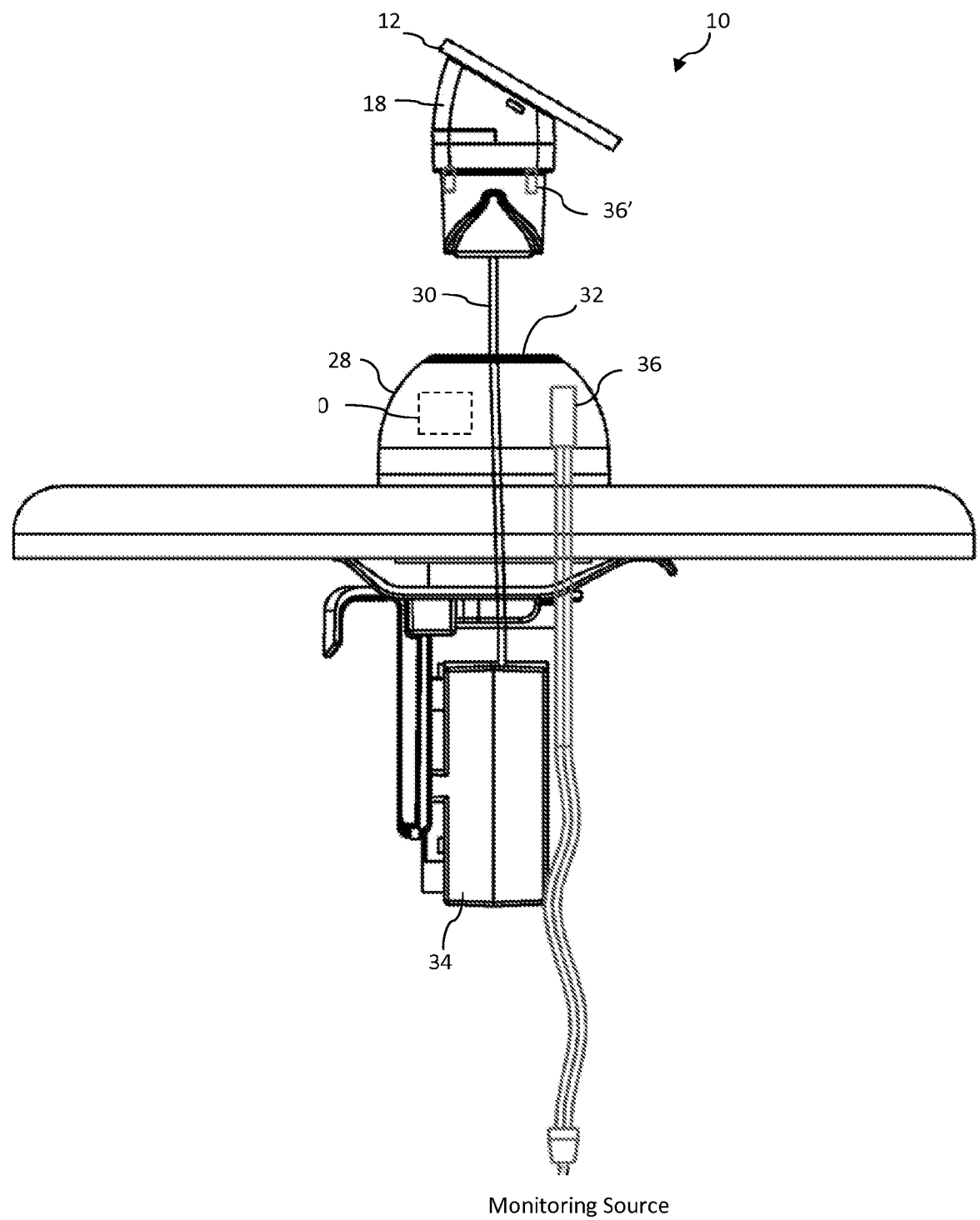
FIG. 5 is a schematic of an embodiment depicting a base member having a primary coil with a mounting member removed from said base member.
Figure 6:
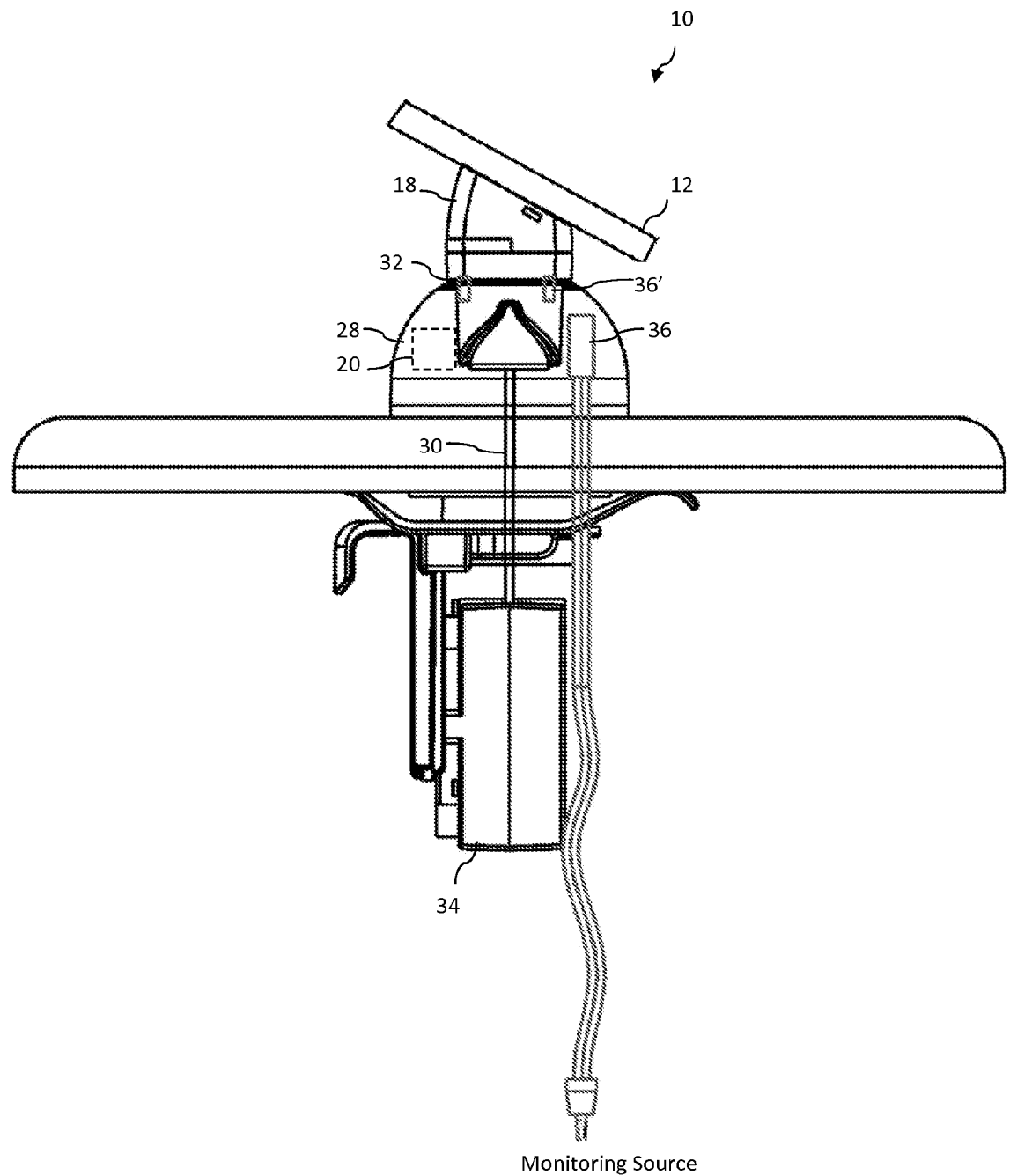
FIG. 6 is a schematic of an embodiment depicting a base member having a primary coil with a mounting member in place on said base member.

As depicted in FIGS. 5 and 6, base member 28 includes passageway 32 for cable 30 to pass through. Cable 30 includes a length defined by a first and second end. The first end is attached to inductively charged electronic device 12 (via mounting member 18) and the second end is anchored within cord reel 34. Primary coil 20 is disposed within base member 28 and is in electrical communication with a power source. Primary coil 20 forms an electromagnetic field coupling with a secondary coil within inductively charged electronic device 12 (the electromagnetic field coupling is similar to FIGS. 1 and 2) so as to inductively convey energy for charging a rechargeable battery when inductively charged electronic device 12 is resting on or near base member 28. As mounting member 18 with attached inductively charged electronic device 12 is removed from base member 28 and moved about by prospective customers, cable 30 is automatically and conveniently extended and retracted by cord reel 34.

In the second embodiment, the base member may include several passageways. An electronic device would be associated with each passageway, allowing several electronic devices to be used with a single inductively charging base member. Passageways not being used are capped to present a flush professional look. Moreover, each electronic device and passageway is equipped with a respective mating support coupling so that the electronic device may be removeably supported within the passageway of the base member. As stated above, the cable assembly includes a length defined by a first and second end. The first end is attached to the electronic device, and the second end is anchored. The cable assembly may include a reel on the opposite side of the base member as the electronic device, with a portion of the cable assembly passing through the passageway of the base member.

In both the first and second embodiments, the base member may include a fastener for fastening it to a display rack, display counter, or the like. Each base member and mounting member may be equipped with a respective mating support coupling so that the mounting member may be removably attached to and supported on the base member. Thus, an electronic device to be displayed may be removed from the base member and moved about as a customer demonstrates and tries out the device. Moreover, although the embodiment depicted in FIGS. 5 and 6 utilizes a tubular base member arm portion and a cooperating tubular mounting member portion to removably attach the mounting portion to the base portion, it is understood that other means of removably fastening the mounting member to the base member are envisioned.

In both the first and second embodiments, the cable assembly may include several conductors including but not limited to video, power supplies, ground, and a security circuit. In this manner, the single cable assembly replaces several individual cables. The security circuit of the cable assembly may include an electronic circuit that is opened if the cable assembly is cut or disconnected, as would occur during a shoplifting attempt. If the security circuit is opened, an alarm will automatically sound.

In both the first and second embodiments, a source module and/or CPU may be included. The source module/CPU may be equipped to provide multi-conductor input and output connections for a plurality of individual retail display devices. Also, the source module/CPU may be wired to carry various input and output signals as required. For example, in an embodiment, the source module/CPU may be wired to carry a power signal, an anti-theft circuit, a light detector circuit, a reed switch, a consumer interaction circuit, and/or a video circuit. The source module/CPU is also configured to provide various output connections to carry signals to other devices; for example, it may carry video to monitors, security to a security system, electric eye circuit, or for power input. The source module/CPU may be designed and constructed to provide these connections in manners known to those skilled in the art.

In both the first and second embodiments, the retail display device includes a detecting means for detecting the presence/absence of the mounting member. For example, as depicted in FIGS. 5 and 6, the preferred detecting means is magnetic reed switch 36 and 36' which is activated by the removal of a magnetic field when mounting member 18 is removed from base member 28. In an alternate embodiment, a light sensor is used.

In both the first and second embodiments, an additional mechanical antitheft apparatus may be used. For example, a mechanical button disposed on a surface of the mounting member is connected to an anti-theft electronic circuit. When the mounting member is affixed to the electronic device, the mechanical button in compressed and the anti-theft electronic circuit is closed, indicating that the mounting member and the electronic device are affixed together. Should the mounting member be detached from the electronic device, the anti-theft circuit will be opened thereby setting off an alarm.

In both the first and second embodiments, the retail display device may be configured to conform to the Qi standard as established by the Wireless Power Consortium for inductive charging. In this manner, the retail display device can be used with a variety of different electronic devices also configured to the Qi standard for inductive charging. This eliminates the need for changing several required cables when moving devices between display positions, and thereby allows for substantially easier and quicker device movement and installation than previously allowed.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A retail display device for use with a plurality of inductively charged electronic devices having a secondary coil and a rechargeable battery, said retail display device comprising:
   a cable assembly having a length defined by a first and second end including at least one electrical conductor;
   a mounting member adapted to receive said first end of said cable assembly, said mounting member adapted to be affixed to said plurality of inductively charged electronic devices;
   a primary coil for electromagnetic field coupling disposed within said mounting member and in electrical communication with said at least one conductor of said cable assembly, whereby said primary coil forms an electromagnetic field coupling with said secondary coil of said plurality of inductively charged electronic devices so as to inductively convey energy for charging said rechargeable battery;
   a secondary electrical circuit disposed within said mounting member;
   a mechanical button in electrical communication with said secondary electrical circuit, said mechanical button having a first compressed and a second decompressed positions, whereby said secondary electrical circuit is closed when said mechanical button is in said first compressed position and opened when said mechanical button is in said second open position, said mechanical button being configured to be in said first compressed position while said mounting member is affixed to said inductively charged electronic device; and
   an alarm module in electrical communication with said secondary electrical circuit, said alarm module configured to detect said secondary electrical circuit being opened, whereby disengaging said mounting member from said inductively charged electronic device activates an alarm.

2. A retail display device as in claim 1, further comprising:
   a reel that retractably stores at least a portion of said length of said cable assembly.

3. A retail display device as in claim 1, further comprising:
said length of said cable assembly having a coiled portion, whereby said length is partially coiled when in a repose position and partially uncoiled when in an extended position.

4. A retail display device as in claim 1, further comprising:
said cable assembly being adapted to convey at least one of a power signal, a security signal, a charging monitoring signal, a device monitoring signal, and a customer interaction signal.

5. A retail display device as in claim 1, further comprising:
said plurality of inductively charged electronic devices being chosen from the group consisting of a camera, a mobile phone, a laptop, a portable game console, an MP3 player, a PDA, and a handheld electronic device.

6. A retail display device as in claim 1, further comprising:
a base member adapted to be mounted to a surface associated with a product display.

7. A retail display device as in claim 6, further comprising:
said base member and said mounting member each being equipped with a respective mating support coupling so that said mounting member may be removably attached to and supported on said base member, whereby said plurality of inductively charged electronic devices to be displayed may be removed from said base member and moved about as a customer demonstrates and tries out said device.

8. A retail display device as in claim 7, further comprising:
detection means for detecting when said mounting member is removed from said base member.

9. A retail display device as in claim 1, further comprising:
said retail display device configured to confirm with the Qi standard for inductive charging.

10. A retail display device as in claim 1, further comprising:
said second end of said cable assembly being in communication with a CPU for monitoring at least one of a power signal, a security signal, a charging monitoring signal, a device monitoring signal, and a customer interaction signal.

11. A retail display device as in claim 1, further comprising:
said second end of said cable assembly being in communication with a source module, said source module being adapted to receive and transmit input and output source signals.

12. A retail display device for use with a plurality of inductively charged electronic devices having a secondary coil and a rechargeable battery, said retail display device comprising:
a base member for displaying said inductively charged electronic devices, said base member including at least one passage through said base member;
at least one primary coil for electromagnetic field coupling disposed within said base member and in electrical communication with a power source, whereby said primary coil forms an electromagnetic field coupling with said secondary coil of said plurality of inductively charged electronic devices so as to inductively convey energy for charging said rechargeable battery when said plurality of inductively charged electronic devices are resting on or near said base member; and
a secondary electrical circuit disposed within said mounting member;
a mechanical button in electrical communication with said secondary electrical circuit, said mechanical button having a first compressed and a second decompressed positions, whereby said secondary electrical circuit is closed when said mechanical button is in said first compressed position and opened when said mechanical button is in said second open position, said mechanical button being configured to be in said first compressed position while said mounting member is affixed to said inductively charged electronic device;
an alarm module in electrical communication with said secondary electrical circuit, said alarm module configured to detect said secondary electrical circuit being opened, whereby disengaging said mounting member from said inductively charged electronic device activates an alarm.

13. A retail display device as in claim 12, further comprising:
at least one cable assembly having a length defined by a first and second end, said first end being attached to said plurality of inductively charged electronic devices, said second end being anchored, said length of said at least one cable assembly to passing through said at least one passage of said base member.

14. A retail display device as in claim 12, further comprising:
a plurality of caps for placement in said at least one passage of said base member that is not being used.

15. A retail display device as in claim 12, further comprising:
a backside of said base member having a plurality of recessed conduits for wire management.

16. A retail display device as in claim 12, further comprising:
said plurality of inductively charged electronic devices and said at least one passage each being equipped with a respective mating support coupling so that said plurality of inductively charged electronic devices may be removeably supported within said at least one passage of said base member.

17. A retail display device as in claim 13, further comprising:
a reel that retractably stores at least a portion of said length of said cable assembly.

18. A retail display device as in claim 12, further comprising:
detection means for detecting when said electronic device is removed from said base member.

19. A retail display device as in claim 12, further comprising:
said retail display device configured to confirm with the Qi standard for inductive charging.

20. A retail display device as in claim 13, further comprising:
said length of said cable assembly having a coiled portion, whereby said length is partially coiled when in a repose position and partially uncoiled when in an extended position.

21. A retail display device for use with a plurality of inductively charged electronic devices having a secondary coil and a rechargeable battery, said retail display device comprising:
a base member for displaying said inductively charged electronic devices;
at least one primary coil for electromagnetic field coupling disposed within said base member and in electrical communication with a power source, whereby said primary coil forms an electromagnetic field coupling with said secondary coil of said plurality of inductively charged electronic devices so as to inductively convey energy for charging said rechargeable battery when said plurality of inductively charged electronic devices are resting near said base member; and at least one cable assembly having a length defined by a first and second end, said first end being attached to said plurality of inductively charged electronic devices, said second end being anchored.

* * * * *